M. M. DAVIS.
PROTECTING DEVICE FOR ELECTRICAL INSTRUMENTS.
APPLICATION FILED JUNE 5, 1917.
1,352,117.  Patented Sept. 7, 1920.
2 SHEETS—SHEET 2.
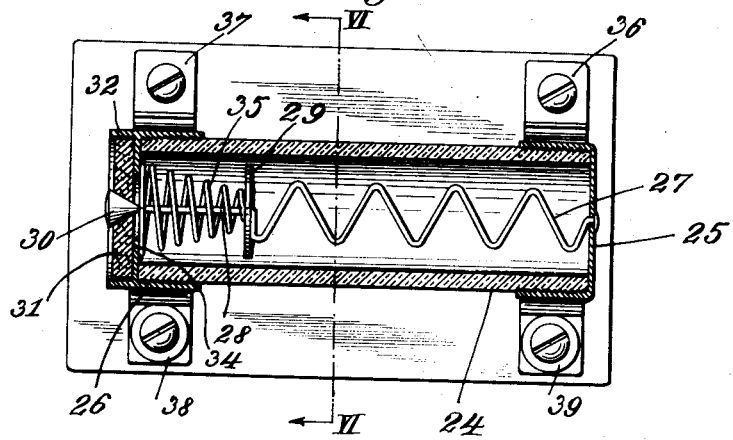
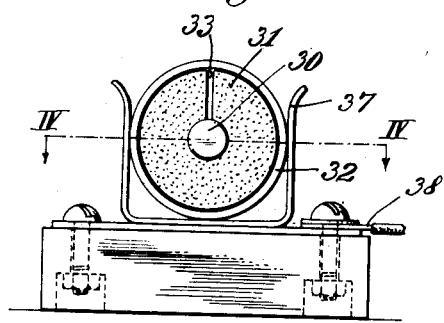
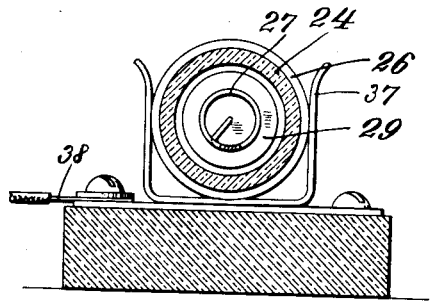
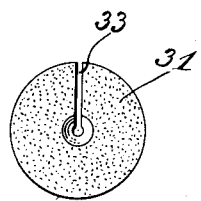
M. M. Davis, Inventor
By his Attorney
Charles H. Cresson M. M. DAVIS.
PROTECTING DEVICE FOR ELECTRICAL INSTRUMENTS.
APPLICATION FILED JUNE 5, 1917.
1,352,117.
Patented Sept. 7, 1920.
2 SHEETS—SHEET 1.
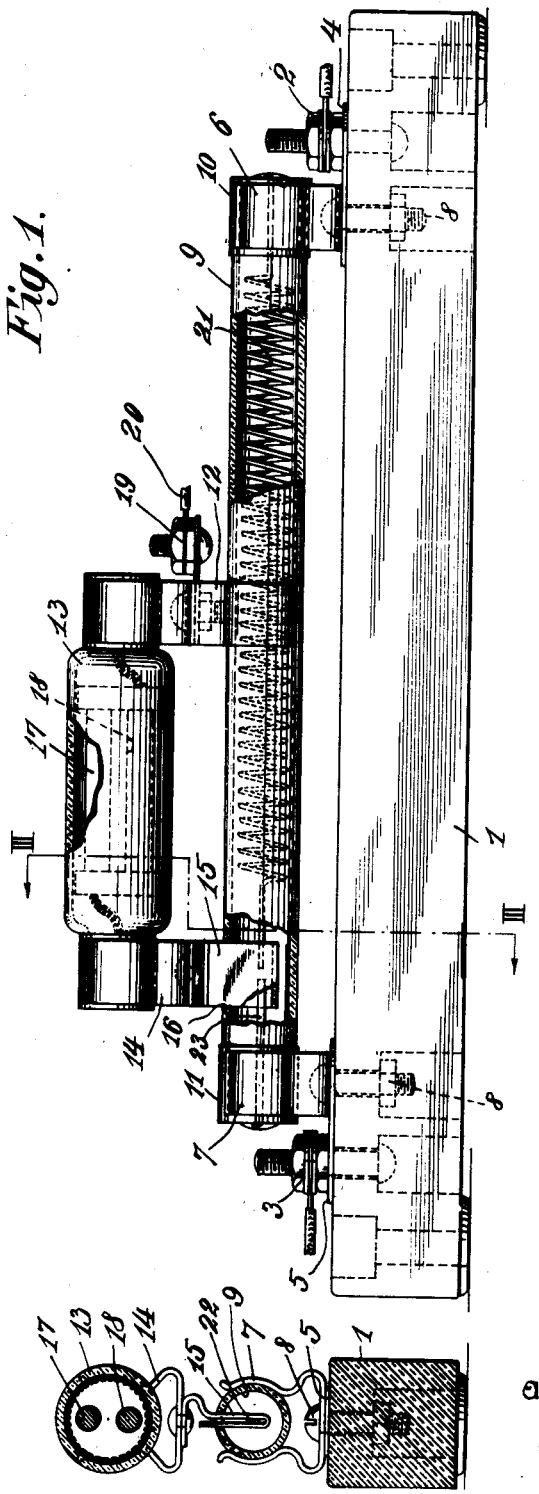
Inventor
M. M. Davis
Attorney
Charles H. Wilson

UNITED STATES PATENT OFFICE.

MINOR M. DAVIS, OF NEW YORK, N. Y.

PROTECTING DEVICE FOR ELECTRICAL INSTRUMENTS.

1,352,117.  Specification of Letters Patent.  Patented Sept. 7, 1920.

Application filed June 5, 1917. Serial No. 172,866.

*To all whom it may concern:*

Be it known that I, MINOR M. DAVIS, residing at New York, in the county and State of New York, have invented certain new and useful Improvements in Protecting Devices for Electrical Instruments, of which the following is a specification.

This invention relates to apparatus for protecting electrically operated instruments, or apparatus from the destructive effects of abnormal currents or impulses due to lightning discharges, crosses with conductors carrying higher potential, and other similar causes.

One of the objects of the invention is to provide apparatus of the above character which will be inexpensive to manufacture, and certain in operation, and of such construction that it can be used with existing installations.

Another object contemplates the provision of an improved device designed to be employed in connection with lightning arresters such that when owing to unusual conditions the arrester becomes heated through arcing, the said device will operate to break the circuit, thereby cutting off the injurious current and thus eliminating any chance of fires originating from heated or destroyed arresters, the hot pieces of which heretofore were liable to come in contact with the box or casing usually employed to inclose such installations.

A further important object of the invention is to provide means which will permit the installation of fuses of heavier current carrying capacity in telegraph and telephone circuits, thereby eliminating the chance of loss of line service in the event of lightning discharges when the latter are properly cared for by the lightning arrester, but which will open the circuit if dangerous arcs are established in or about the arresters, thus preserving the fuses and minimizing the fire risks.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:

Figure 1 is a side elevational view of my improved device, showing the same employed in connection with a lightning arrester of the vacuum type, parts of the structure being broken away better to disclose the construction.

Fig. 2 is a top plan view of the device shown in Fig. 1.

Fig. 3 is a vertical sectional view taken on the line III—III of Fig. 1.

Fig. 4 is a horizontal sectional view of another embodiment of my invention.

Fig. 5 is an end view of the device illustrated in Fig. 4.

Fig. 6 is a vertical sectional view taken on the line VI—VI of Fig. 4.

Fig. 7 is a view in elevation of a part of the device.

Referring now to the drawings, wherein similar reference characters refer to similar parts, the reference numeral 1 denotes a suitable base upon which the various parts are mounted, said base being formed of a rectangular block of insulating material, such as porcelain or the like.

2 and 3 indicate respectively the line terminals, said terminals being suitably mounted at opposite ends of the base member, each of said terminals being mounted upon and in electrical contact with plates 4 and 5 respectively, which rest upon the upper surface of the base member 1. Spring terminal clips 6 and 7 are fastened upon the plates 4 and 5 respectively, as by means of bolts 8, which are suitably secured in apertures formed in the base member 1.

The reference numeral 9 indicates a tube, preferably formed of glass, the ends of which are provided with metallic clips 10 and 11 respectively. These caps are adapted to be removably received in the clips 6 and 7, which support the tube. Thus the tube 9 and its end caps form a cartridge which can be mounted in the supporting clips or removed therefrom at will.

Mounted upon the tube 9 is a spring clip 12, which receives one of the metallically capped ends of a lightning arrester 13, herein as shown of the vacuum type. Another spring clip 14 in which the other end of the similarly capped lightning arrester 13 is mounted, has a depending substantially U-shaped part 15, which extends through an elongated aperture 16 provided in the glass tube 9. Within the lightning arrester 13 is provided the usual spaced electrodes 17 and 18. 19 indicates a terminal to which a ground wire 20 is attached.

Located within the tube 9, and electrically and mechanically connected with the cap 10, is a coiled wire spring 21, said spring extending through the tube to a point adjacent the opposite end thereof, and having its end received in the U-shaped member 15, and secured thereto as by means of fuse metal 22. The spring 21 is held under tension, as shown.

Connected with the cap member 11 is a wire 23, which is also electrically and mechanically connected with the U-shaped member or clip 15. Thus it will be seen that the terminals 2 and 3 are electrically connected by means of the clips 6 and 7, spring 21, clip 14, and wire 23. It is intended to employ a fuse metal of considerable current carrying capacity for connecting the spring member 21 with the clip 14, but a metal which will be quickly melted by the direct action of heat.

By means of the construction above described, it will be seen that if the arrester 13 arcs to such an extent as to dangerously heat the metallic ends thereof the heat will be transmitted through the clip 14 to the fuse metal 22, causing the latter to melt, whereby the end of the spring attached to said clip will be released, and the contraction of the spring will disengage said end from the clip, thereby breaking the circuit.

Referring now to the embodiment of my invention disclosed in Fig. 4, 24 indicates a cartridge formed by a cylindrical glass tube, the ends of which are closed by metallic caps 25 and 26 respectively. Fastened to the cap 25 is a retractile spring 27, which extends partly through the tube, said spring having a straight portion 28 at its opposite end, which passes through a plate 29. The outer end of this straight portion 28 of said spring is connected to the conically shaped block 30. This conical member 30 rests in the center of a cylindrical disk 31, which is formed of wax, soft lead, or other material, having a predetermined melting point. Disk 31 rests in an outward cylindrical extension 32 of the cap 26, and is slotted, as at 33, to permit the insertion of the end 28 of the spring 27, which carries the conically formed block 30.

Positioned between the plate 29 and a shoulder 34 formed interiorly of the cap 26, is an extensile spring 35. This spring forms electrical connection between the spring 27 and the cap member 26. Thus it will be seen that the cap members 25 and 26 are electrically connected, as are the spring clips 36 and 37, in which the metallic ends of the cartridge 24 are positioned. In use it is intended that this device shall be connected in circuit with some electrical apparatus as by means of terminals 38 and 39, the end of the device carrying the fusible material 31, being located adjacent some part which is liable to be overheated, whereby in case of such overheating, said fusible material will melt, allowing the springs 27 and 35 to act, whereby the latter will be disengaged from the shoulder 34, thereby breaking the circuit.

It will accordingly be seen that I have provided a construction well adapted to attain, among others, all the ends and objects above pointed out, in an exceedingly simple and efficient manner.

It will be seen that the use of this improved device in telephone and telegraph installations will not only minimize the destruction of property, and apparatus, through fires caused by overheated arresters, but will also prevent the blowing of fuses, the destruction of which very often causes the loss of valuable time in places where the fuses cannot be quickly replaced, such for instance as stations or offices through which busy wires pass and which are closed during the night.

Although I have shown my device as adapted for use in connection with a lightning arrester of the vacuum type, it is understood of course that it is also well adapted for use in connection with other forms of lightning arresters, and with other devices and apparatus where injurious arcs are liable to occur.

As many changes could be made in this construction without departing from the scope of the following claims, it is intended that all matter contained in the above description or shown in the accompanying drawing shall be interpreted as illustrative only and not in a limiting sense.

Having thus described my invention what I claim as new and desire to secure by Letters Patent is:

1. In electric protective apparatus, in combination, a block of insulating material provided with line terminals, a tubular member provided with metallically capped ends adapted to be detachably connected with said terminals, means provided within said tubular member including a spring and a body of fusible material adapted to establish an electrical connection between said terminals, a lightning arrester mounted upon said tubular member, one terminal of which extends into said tubular member and is mechanically connected with said body of fusible material, and the other adapted to connect with ground, the connection between the terminal of said lightning arrester and said fusible material being adapted mechanically to conduct heat from the former to the latter.

2. In electric protective apparatus, in combination, a base of insulating material having line terminals, spring clips connected with said line terminals, a tubular member of insulating material provided with metallically capped ends adapted to be mounted within said spring clips, means located within said tubular member for connecting the metallically capped ends thereof, including a coil spring attached to one of said metallic caps, a wire attached to the other of said caps, a support for a lightning arrester, fusible material for connecting one end of said coil spring to said support, said support being provided with a spring clip, a second spring clip mounted upon said tubular member, and a lightning arrester mounted in said last mentioned spring clips, one terminal of which is adapted to be connected with ground.

3. In electric protective apparatus, in combination, a base of insulating material provided with line terminals, spring clips mounted upon said base and connected with said terminals, a cartridge mounted in said spring clips, comprising a tubular member having metallically capped ends for engaging the clips, a coil spring located within said tubular member, one end of which is attached to one of the caps thereof, a support for a lightning arrester having a depending part which enters said tubular member and is connected with the opposite end of said coil spring by a body of fusible material, means for connecting the other cap of said tubular member with the depending part of said support, a second support for a lightning arrester mounted upon said tubular member, a lightning arrester having its terminals mounted respectively in said supports, said first mentioned of said supports being adapted to conduct heat generated at the lightning arrester to the fusible material connecting the end of the spring therewith, the other of said supports of the lightning arrester being adapted to be connected with ground.

4. In electric protective apparatus, in combination, a base of insulating material provided with oppositely disposed line terminals, spring clips mounted upon said base and electrically connected with said terminals, a cartridge formed of a tubular member of insulating material having metallic caps adapted to be mounted in said spring clips, means normally under tension for connecting together the caps provided on said tubular member, a portion of said last mentioned means being formed of a body of fusible material, a pair of spring clips mounted upon said tubular member for receiving the opposite terminals of a lightning arrester, a lightning arrester mounted in said spring clips, one of said spring clips having a part depending therefrom which extends within said tubular member and is connected with said member under tension by said fusible material, and means for connecting the other of said last mentioned spring clips with ground.

5. In electric protective apparatus, the combination with a lightning arrester or the like, of a device upon which said arrester is mounted comprising a base of insulating material having line terminals, a device connected with said line terminals, comprising a tubular member provided with metallically capped ends which forms said detachable connection, supports for said lightning arrester, one of which is mounted exteriorly of said tubular member, and the other of which is provided with a part which extends interiorly thereof, a member normally held under tension, located within said tubular member, one end of which is connected with one of the caps thereof, a body of fusible material connecting the other end of said member under tension with a part of said support which extends within said tubular member, means for electrically connecting said part to the other of said caps, the support of said lightning arrester which is connected with said fusible material being adapted to conduct heat generated at the lightning arrester thereto.

6. In electric protective apparatus, in combination, a base of insulating material provided with line terminals, a tubular member having metallically capped ends detachably connected with said line terminals, circuit completing means located within said tubular member which is electrically and mechanically attached to the opposite ends thereof, a portion of said circuit completing means being formed of a member under tension and a body of fusible material, a pair of supports mounted upon said tubular member one of which has a part which depends through an aperture provided within said tube and is connected with said fusible material, a lightning arrester having its terminals mounted in said support such that when excessive heat is generated at the lightning arrester such heat will be communicated to said fusible material, thereby to melt the same, and means for connecting the other terminal of said lightning arrester with ground.

7. In electric protective apparatus, in combination, a base of insulating material provided with line terminals, spring clips mounted upon said base and connected with said line terminals, a tubular member provided with metallically capped ends mounted in said clips, a lightning arrester, a pair of metallic supports for said lightning arrester, one of which has a part entering said tubular member for mechanically and electrically connecting the capped ends thereof, comprising a spring under tension connected with said part by a body of fusible material, and a wire connecting said part of said support with the other cap of said tubular member, the said support which has the part entering the tube being such that when excessive heat is generated at the lightning arrester the same will be communicated to said body of fusible material, whereby the latter will be melted and said spring member released to break the circuit.

8. In electric protective apparatus, in combination, a base member of insulating material provided with line terminals, two elements mounted in superimposed relation upon said base member, spring clips connected with said terminals, supporting one of said elements, said element being adapted to establish electrical connection between said terminals and having a part adapted to be disrupted by heat, the other of said elements comprising a lightning arrester, spring clips for supporting said lightning arrester, one of said spring clips having a part adapted to be connected with the part of the other element which is adapted to be disrupted by heat, whereby heat conducted thereto from the lightning arrester will disrupt the same and break the circuit.

In testimony whereof I affix my signature in the presence of two witnesses.

MINOR M. DAVIS.

Witnesses:
A. J. EAVES,
H. F. WYMAN.